(12) United States Patent
Kim et al.

(10) Patent No.: US 12,430,867 B2
(45) Date of Patent: Sep. 30, 2025

(54) DNN-BASED OBJECT RECOGNITION METHOD FOR MULTI-CHANNEL FISHEYE IMAGES OF AVM VIDEO

(71) Applicants: Sang Gu Kim, Seoul (KR); Jin Bok Kim, Seongnam-si (KR); In Sub Lee, Seongnam-si (KR)

(72) Inventors: Sang Gu Kim, Seoul (KR); Jin Bok Kim, Seongnam-si (KR); In Sub Lee, Seongnam-si (KR)

(73) Assignee: LITBIG INC., Seongnam-si (KR)

( * ) Notice: Subject to any disclaimer, the term of this patent is extended or adjusted under 35 U.S.C. 154(b) by 0 days.

(21) Appl. No.: 19/034,330

(22) Filed: Jan. 22, 2025

(65) Prior Publication Data

US 2025/0272941 A1 Aug. 28, 2025

(30) Foreign Application Priority Data

Feb. 23, 2024 (KR) .................. 10-2024-0026234

(51) Int. Cl.
| | |
|---|---|
| *H04N 7/00* | (2011.01) |
| *G06V 10/10* | (2022.01) |
| *G06V 10/82* | (2022.01) |
| *G06V 20/40* | (2022.01) |
| *G06V 20/58* | (2022.01) |

(52) U.S. Cl.
CPC .............. *G06V 10/16* (2022.01); *G06V 10/82* (2022.01); *G06V 20/40* (2022.01); *G06V 20/58* (2022.01)

(58) Field of Classification Search
USPC .......................................................... 348/38
See application file for complete search history.

(56) References Cited

U.S. PATENT DOCUMENTS

| | | | |
|---|---|---|---|
| 2019/0225210 A1* | 7/2019 | Herman ................. | G08G 1/161 |
| 2019/0362512 A1* | 11/2019 | Plowman .............. | G06V 20/58 |
| 2020/0042801 A1* | 2/2020 | Auner ................... | G06V 20/58 |
| 2023/0162464 A1 | 5/2023 | Kondiparthi et al. | |

FOREIGN PATENT DOCUMENTS

| | | |
|---|---|---|
| KR | 10-2017-0111504 A | 10/2017 |
| KR | 10-2018-0001869 A | 1/2018 |
| KR | 10-2021-0034885 A | 3/2021 |
| KR | 10-2583959 B1 | 9/2023 |

* cited by examiner

*Primary Examiner* — Nigar Chowdhury
(74) *Attorney, Agent, or Firm* — PARK LAW FIRM

(57) ABSTRACT

The present invention generally relates to a technology for recognizing objects in a Around View Monitoring (AVM) video for a vehicle. In particular, the present invention relates to a DNN-based object recognition method for multi-channel fisheye images of a vehicle AVM apparatus, by projecting multi-channel unit images of fisheye-lens cameras of the vehicle AVM apparatus onto a cylindrical projection plane so as to obtain multi-channel unit projection images, combining the multi-channel unit projection images on a single image so as to obtain a composite projection image, and inputting the composite projection image to a Deep Neural Network (DNN) model so as to obtain object recognition output. The invention has an advantage that AVM apparatus can effectively assist in safe driving by monitoring objects around the vehicle. Further, the present invention has an advantage that object recognition may be effectively achieved by the insufficient computing resources of vehicles.

5 Claims, 10 Drawing Sheets

(A)

(B)

(A)           (B)

(A) CYLINDRICAL PROJECTION IMAGE FOR 360 DEGREE AROUND THE VEHICLE (B) UNIT PROJECTION IMAGE FOR FRONT CAMERA (C) UNIT PROJECTION IMAGE FOR LEFT CAMERA (D) UNIT PROJECTION IMAGE FOR RIGHT CAMERA (E) UNIT PROJECTION IMAGE FOR REAR CAMERA (A) COMPOSITE PROJECTION IMAGE (B) COMPOSITE OBJECT-RECOGNITION OUTPUT (A) UNIT OBJECT-RECOGNITION OUTPUT FOR FRONT CAMERA (B) UNIT OBJECT-RECOGNITION OUTPUT FOR LEFT CAMERA (C) UNIT OBJECT-RECOGNITION OUTPUT FOR RIGHT CAMERA (D) UNIT OBJECT-RECOGNITION OUTPUT FOR REAR CAMERA

DNN-BASED OBJECT RECOGNITION METHOD FOR MULTI-CHANNEL FISHEYE IMAGES OF AVM VIDEO

BACKGROUND OF THE INVENTION

Field of the Invention

The present invention generally relates to a technology for recognizing objects in a Around View Monitoring (AVM) video for a vehicle.

In particular, the present invention relates to a DNN-based object recognition method for multi-channel fisheye images of a vehicle AVM apparatus, by projecting multi-channel unit images of fisheye-lens cameras of the vehicle AVM apparatus onto a cylindrical projection plane so as to obtain multi-channel unit projection images, combining the multi-channel unit projection images on a single image so as to obtain a composite projection image, and inputting the composite projection image to a Deep Neural Network (DNN) model so as to obtain object recognition output.

Description of the Related Art

In recent years, there has been a trend to introduce Around View Monitoring (AVM) systems in vehicles. Around View Monitoring (AVM), which may be named as Surround View Monitoring (SVM), is a technology of providing a top view or a bird's eye view centered on a vehicle by installing cameras on front, rear, right, and left sides of the vehicle, imaging front, rear, right, and left sides around the vehicle, and then combining camera videos. Drivers can recognize situations around a vehicle by the AVM video, which makes driving or parking be convenient.

FIG. 1 is a conceptual view of 2D AVM image processing. Cameras are mounted on front and rear sides of a vehicle, as well as both right and left sides thereof, and camera videos provided from these cameras are subjected to distortion correction to be made into respective flat images, and then a top-view-like around view video is obtained through stitching (image alignment and composition) processing by applying projections obtained by estimating camera postures. This around view video is provided to a driver on a vehicle interior monitor.

While 2D AVM provides a top view as described above, 3D AVM provides an image plane from a three-dimensional (3D) viewpoint. Since the viewpoint is converted to a three dimension, the driver can accurately understand a situation around the vehicle, as compared to an existing AVM. FIG. 2 is an exemplary view of 2D AVM video and 3D AVM video. FIG. 2 (A) is a 2D AVM video, in which the left one is a rear camera video and the right one is a bird's eye view (top view) video. FIG. 2 (B) is a 3D AVM video. Referring to FIG. 2 (B), the 3D AVM video provides a composite video in a 3D viewpoint, thereby enabling the driver to better recognize situations around the vehicle.

FIG. 3 is a conceptual view of 3D AVM image processing. In the 3D AVM, a 3D video is created by projecting camera videos onto a cylinder-shaped or bowl-shaped 3D projection plane, and then placing a 3D vehicle model in the center of the 3D video. FIG. 3 illustrates an example of using a bowl-shaped 3D projection plane.

Meanwhile, technology development to reduce traffic accidents is active. For example, it is being adopted to automatically detect pedestrians by cameras on the vehicle and then notify the driver or automatically apply the brakes. Vehicles already have four cameras on the front, back, left, and right of the vehicle for AVM. If the images obtained from these cameras can be used to recognize objects, there will be no need to install additional cameras for object recognition, and objects around the vehicle can be monitored effectively, e.g., pedestrians, motorcycles, vehicles, bicycles, etc.

However, AVM images are inappropriate for object recognition, because fisheye lenses of AVM cameras insert severe distortion in the images. Further, recently, it is common to perform object recognition by a Deep Neural Network (DNN). The distorted images may cause problems in the Receptive Field of the Convolutional Neural Network (CNN) of the Deep Neural Network (DNN), which may degrade the object recognition performance.

Therefore, in order to utilize AVM images for object recognition, a new neural network model suitable for the characteristics of a fisheye lens had to be designed. When applying conventional deep neural networks to AVM images, object recognition performance is low and objects in the periphery of the images are hardly recognized.

Meanwhile, fisheye lenses are commonly used in virtual reality (VR) devices. In the VR field, image distortion is reduced by Equirectangular projection. However, when Equirectangular projection was applied to AVM images, in inventor's tests, it was confirmed that vertical image distortion still remained, which lowered the object recognition rate.

Therefore, it is common idea that AVM images are inappropriate for object recognition.

SUMMARY OF THE INVENTION

An object of the invention is to provide a technology for recognizing objects in a Around View Monitoring (AVM) video for a vehicle.

In particular, an object of the invention is to provide a DNN-based object recognition method for multi-channel fisheye images of a vehicle AVM apparatus, by projecting multi-channel unit images of fisheye-lens cameras of the vehicle AVM apparatus onto a cylindrical projection plane so as to obtain multi-channel unit projection images, combining the multi-channel unit projection images on a single image so as to obtain a composite projection image, and inputting the composite projection image to a Deep Neural Network (DNN) model so as to obtain object recognition output.

In order to achieve the objects described above, the present invention proposes a DNN-based object recognition method for multi-channel fisheye images of AVM video which is executed in a vehicle AVM apparatus.

A DNN-based object recognition method for multi-channel fisheye images of AVM video according to the present invention may comprise:

obtaining multi-channel unit images which are produced by fisheye-lens cameras of the vehicle AVM apparatus; forming a cylindrical projection plane around each of the fisheye-lens cameras; projecting the multi-channel unit images onto the cylindrical projection planes respectively so as to obtain a plurality of unit projection images; combining the unit projection images on a single image so as to form a composite projection image; inputting the composite projection image to a pre-trained Deep Neural Network (DNN) model so as to obtain a composite object-recognition output; decomposing the composite object-recognition output by the layout of the unit projection images so as to obtain unit object-recognition output for each of the multi-channel unit images; identifying an object for each direction of the vehicle out of the unit object-recognition output; and calculating a gap distance to the identified object based on relative position in a horizontal plane between the bottom part of the identified object and the corresponding fisheye-lens camera with assuming that the bottom part of the identified object is attached to the ground.

A computer program according to the present invention is stored in a non-volatile computer-readable storage medium to execute the DNN-based object recognition method for multi-channel fisheye images of AVM video described above on a computer.

DESCRIPTION OF THE PREFERRED EMBODIMENTS

Hereinafter, the invention will be described with reference to the accompanying drawings.

Figure 4:
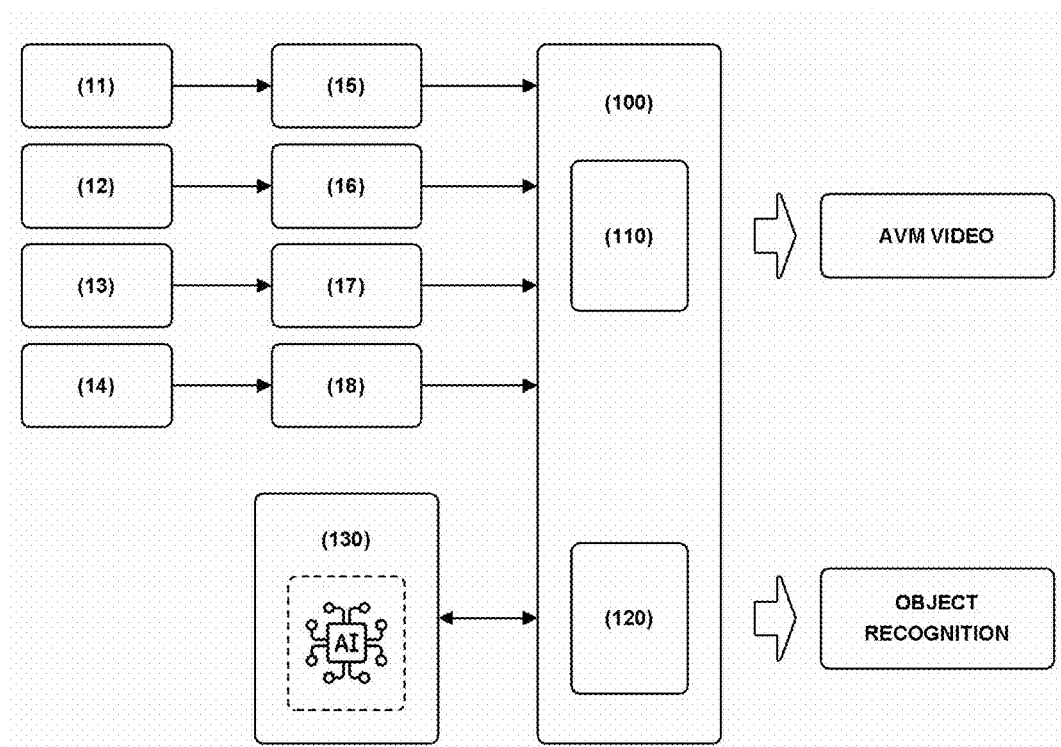
FIG. 4 is a block diagram of a configuration of a DNN-based object recognition apparatus for multi-channel fisheye images of AVM video according to the present invention.

FIG. 4 is a block diagram of a configuration of a DNN-based object recognition apparatus for multi-channel fisheye images of AVM video according to the present invention.

The plurality of cameras 11 to 14 are installed in a vehicle generate a plurality of multi-channel unit images 15 to 18. The multi-channel unit images 15 to 18 are provided to an AVM image processing unit 100 of a vehicle AVM apparatus.

Figure 1:
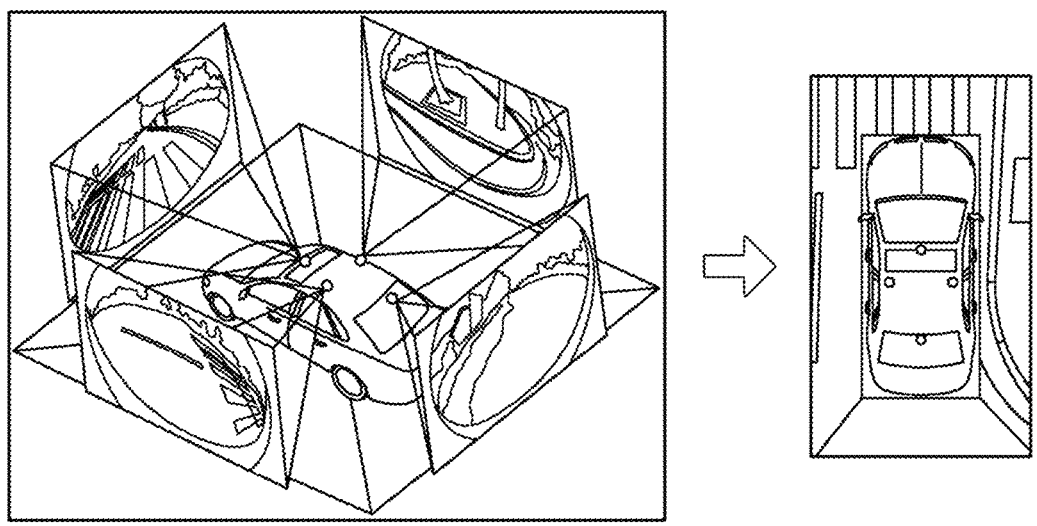
FIG. 1 is a conceptual view of 2D AVM image processing.
Figure 2:
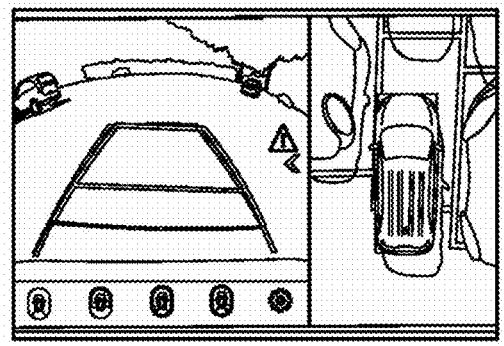
FIG. 2 is an exemplary view of 2D AVM video and 3D AVM video.
Figure 2:
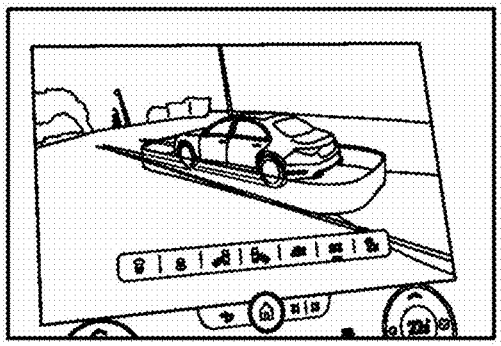
Figure 3:
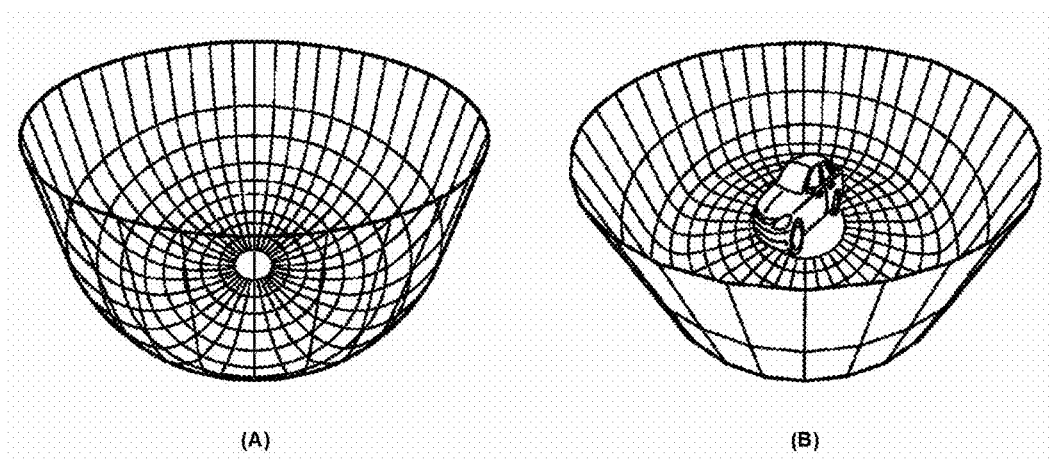
FIG. 3 is a conceptual view of 3D AVM image processing.

The image composition unit 110 of the AVM image processing unit 100 produces 2D or 3D AVM video out of multi-channel unit images 15 to 18 as shown in FIGS. 1 to 3.

The object recognition unit 120 of the AVM image processing unit 100 cooperates with the DNN processing unit 130 so as to perform object recognition for the multi-channel unit images 15 to 18. The object recognition unit 120 adopts cylindrical projection to the multi-channel unit images 15 to 18 so as to obtain a composite projection image. The DNN processing unit 130 performs object recognition for the composite projection image by use of a DNN model. The object recognition unit 120 is provided with an object recognition output for the composite projection image from the DNN processing unit 130, and then obtains object recognition output for each of the multi-channel unit images 15 to 18.

Figure 5:
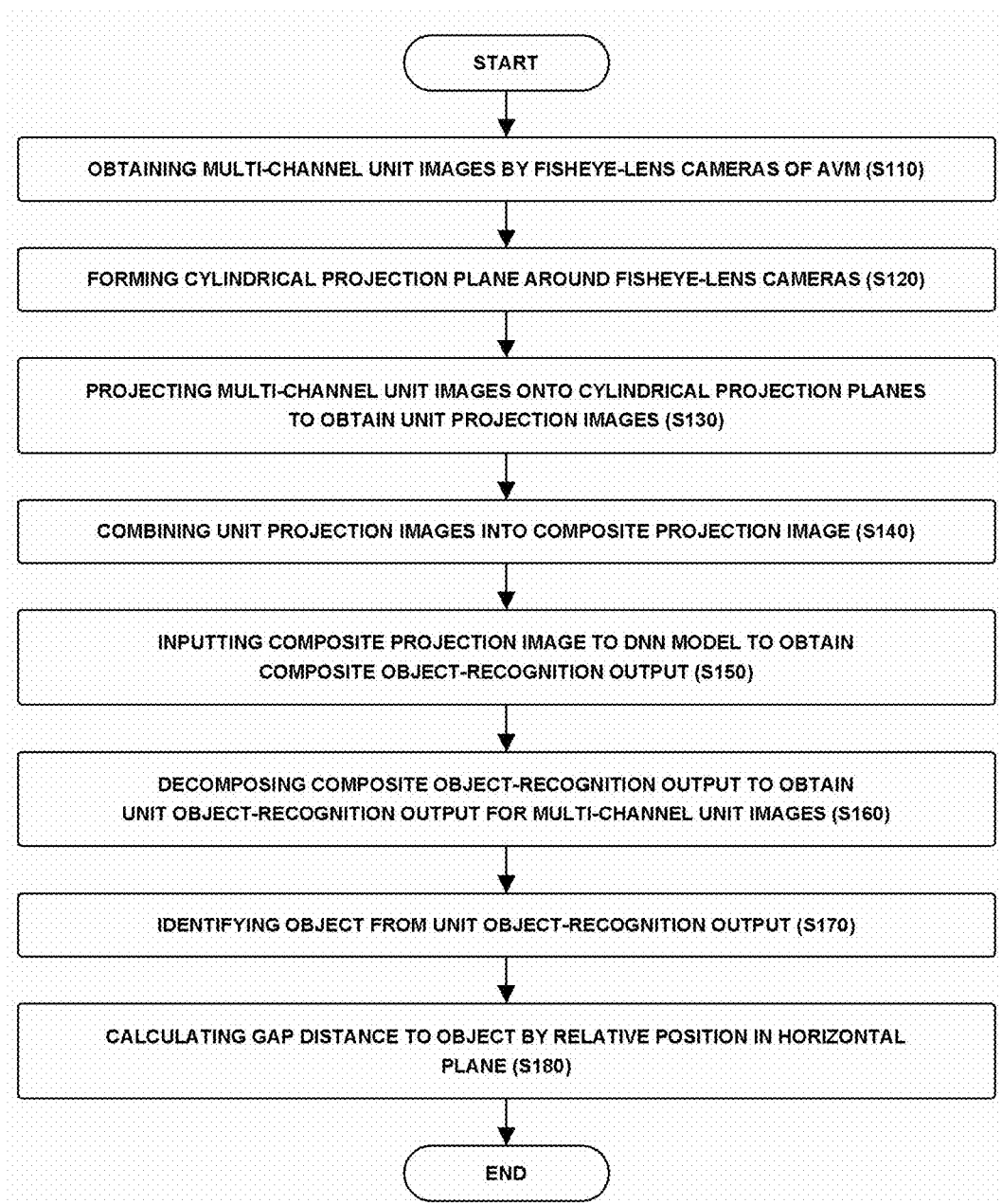
FIG. 5 is a flowchart of a DNN-based object recognition method for multi-channel fisheye images of AVM video according to the present invention.

FIG. 5 is a flowchart of a DNN-based object recognition method for multi-channel fisheye images of AVM video according to the present invention.

Step (S110): The object recognition unit 120 of the AVM image processing unit 100 obtains multi-channel unit images 15 to 18. The multi-channel unit images 15 to 18 are produced by fisheye-lens cameras 11 to 14 of the vehicle AVM apparatus.

Figure 6:
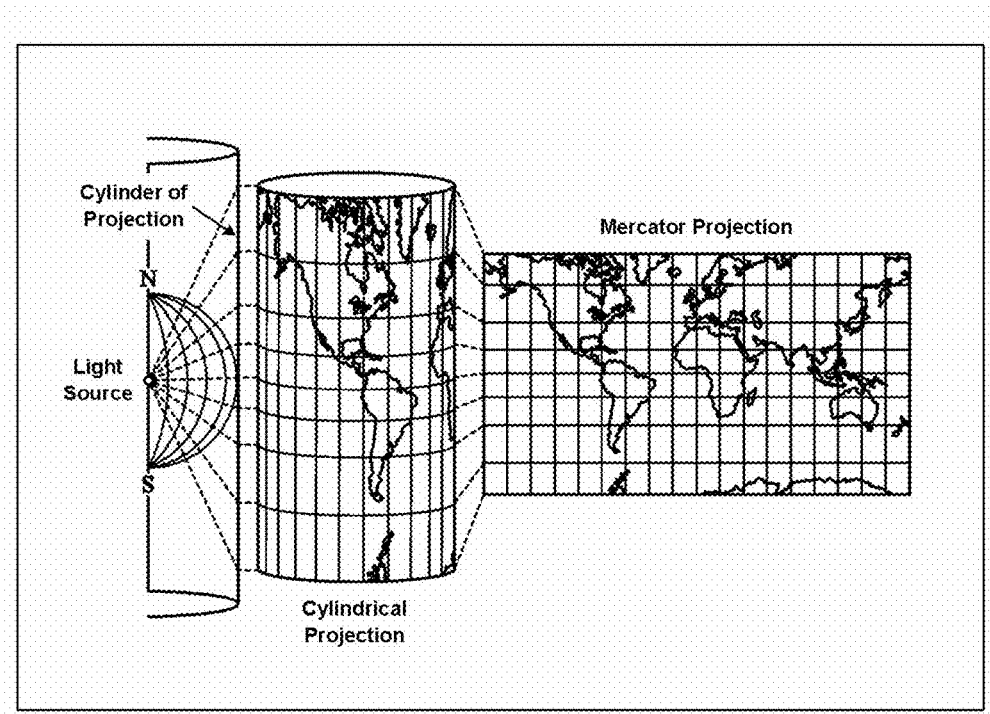
FIG. 6 is a conceptual view of cylindrical projection.

Steps (S120, S130): The object recognition unit 120 forms a cylindrical projection plane around each of the fisheye-lens cameras 11 to 14. The cylindrical projection plane is a virtual plane, and is formed around at a certain distance from each of the fisheye-lens cameras 11 to 14. Then, the object recognition unit 120 projects the multi-channel unit images 15 to 18 onto each of the cylindrical projection planes respectively so as to obtain a plurality of unit projection images. This process can be performed at high speed using a Graphics Processing Unit (GPU) or a hardware Dewarping engine. FIG. 6 is a conceptual view of cylindrical projection.

In a conventional 3D AVM technology, the multi-channel unit images 15 to 18 may be projected onto a projection plane which encompasses the entire vehicle body. However, in the present invention, an individual cylindrical projection plane is utilized for each of the fisheye-lens cameras 11 to 14. That is, four cylindrical projection planes are utilized for four fisheye-lens cameras 11 to 14. This approach is intended to reduce image distortion so as to enhance object recognition rate.

In a conventional 3D AVM technology, the projection plane may be a spherical projection plane, a bowl-shaped projection plane, or a cylindrical projection plane. However, in the present invention, it is preferable that cylindrical projection planes are utilized. The cylindrical projection planes may effectively remove the vertical distortion out of the multi-channel unit images 15 to 18.

In general, lens distortion correction (LDC) refers to the work of changing a distorted image into a form projected onto a plane. However, in AVM in which the horizontal angle of view is 180 degrees, if a camera image is forcibly projected onto a plane, the image should theoretically expand infinitely, which would result in severe distortion. Deep Neural Network (DNN) models for object recognition are generally trained with images taken by narrow-angle cameras. If the forcibly projected images are inputted to the DNN models, the object recognition performance would be insufficient.

The fisheye lens of a vehicle AVM apparatus has a characteristic of wide horizontal angle of view and very narrow vertical angle of view. If a cylindrical projection plane is applied to the fisheye lens image, the image is spread out in the vertical direction, so that an acceptable level of object recognition performance can be obtained even by conventional Deep Neural Network (DNN) models.

As an embodiment, a virtual cylindrical projection plane is formed horizontally around at 10 to 15 meters distance from each of the fisheye-lens cameras 11 to 14. It is preferable that the distance of the cylindrical projection plane is set as 10 to 15 meters in considering that objects within that distance may incur an accident while driving. When the projection plane is formed at the actual location of the object, an image with less distortion can be created by the projection. Considering this, it is preferable to select a distance of cylindrical projection plane which is important for driving a vehicle. Moreover, it is further preferable to dynamically adjust the distance of the cylindrical projection plane by considering the vehicle's driving speed or whether to drive or not. For example, the distance between the cylindrical projection plane and each of the fisheye-lens cameras may be adjusted inversely to the vehicle's driving speed.

Figure 7:
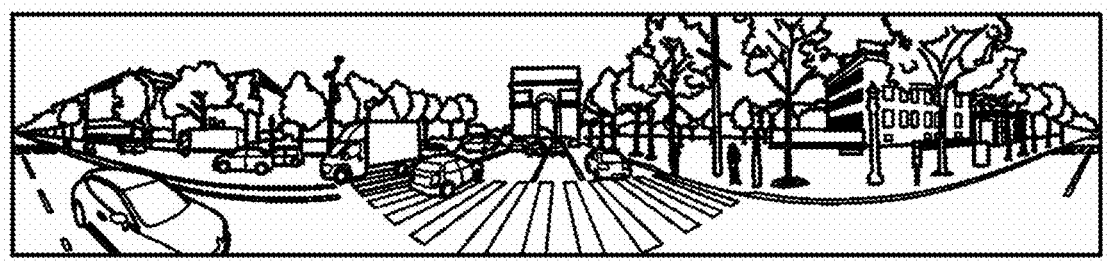
FIG. 7 is an exemplary view of unit projection images of an AVM video.
Figure 7:
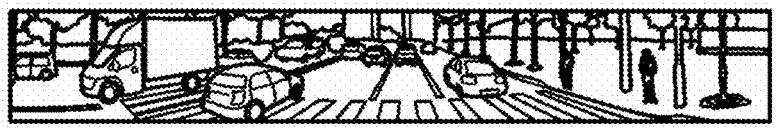
Figure 7:
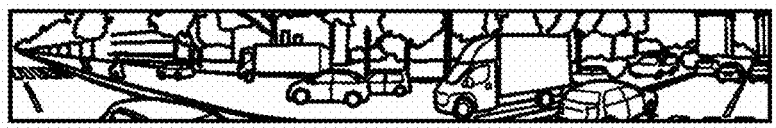
Figure 7:
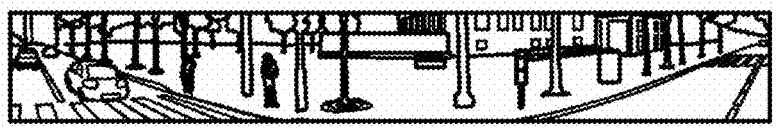
Figure 7:

FIG. 7 is an exemplary view of unit projection images of an AVM video. FIG. 7 (A) is a cylindrical projection image for a 360 degree area around the vehicle. FIGS. 7 (B) to (E) are unit projection images which are generated by projecting the multi-channel unit images 15 to 18 onto each of the cylindrical projection planes, in which the multi-channel unit images 15 to 18 are produced by the front, left, right and rear fisheye-lens cameras 11 to 14 of a vehicle AVM apparatus.

Steps (S140, S150): The object recognition unit 120 combines the unit projection images on a single image so as to form a composite projection image. Then, the object recognition unit 120 inputs the composite projection image to a pre-trained Deep Neural Network (DNN) model of the DNN processing unit 130 so as to obtain a composite object-recognition output.

Figure 8:
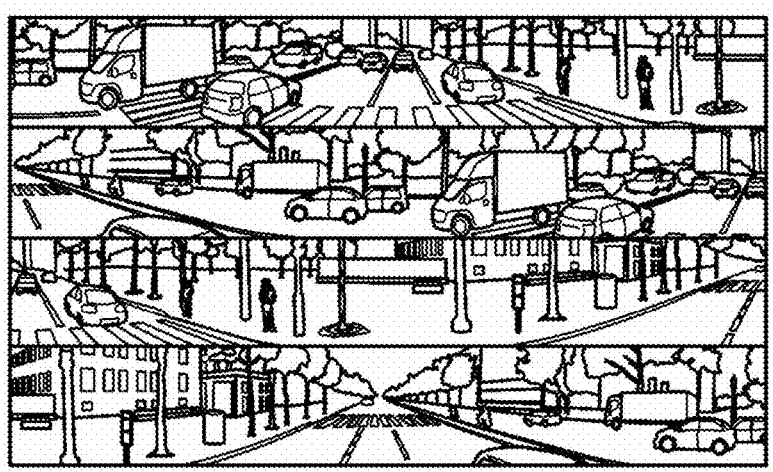
FIG. 8 is an exemplary view of a composite projection image and a composite object-recognition output of an AVM video.
Figure 8:
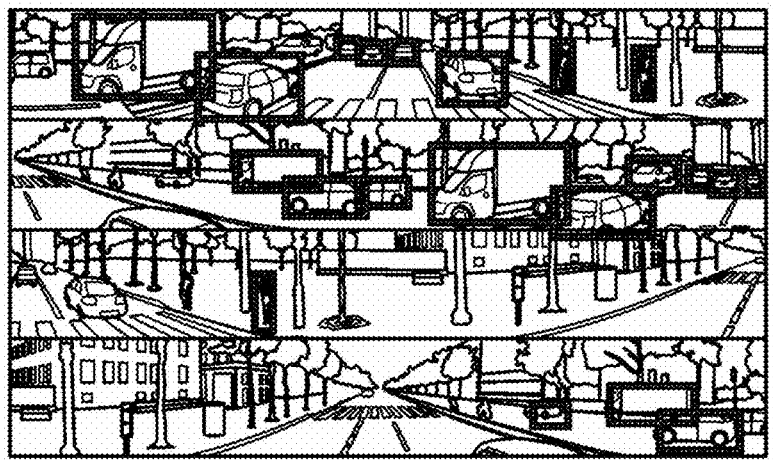

FIG. 8 is an exemplary view of a composite projection image and a composite object-recognition output of an AVM video. FIG. 8 (A) shows a composite projection image which is formed by vertically combining the 4-channel unit projection images of FIG. 7 (B) to (E). The composite projection image is a single image. FIG. 8 (B) shows a composite object-recognition output which is obtained by inputting the composite projection image to a pre-trained Deep Neural Network (DNN) model.

In the present invention, object recognition is performed by inputting the composite projection image of FIG. 8 (A) to a DNN model, in which the composite projection image is obtained by combining or weaving the unit projection images which are obtained by individual cylindrical projections of multi-channel unit projection images onto individual cylindrical projection planes for each of the cameras 11 to 14. It should be noted that, in the present invention, an AVM image of FIG. 7 (A) is not inputted to a DNN model, in which the AVM image is obtained by projecting images onto a common projection plane which encompasses the entire vehicle body. When comparing FIG. 7 (A), FIG. 8 (A) has reduced image distortion in the individual images. Therefore, the approach of the present invention of inputting the composite projection image to a DNN model may provide an enhanced object recognition performance.

In FIG. 8 (A), the 4-channel unit projection images are vertically combined to form the composite projection image. In other embodiment, the 4-channel unit projection images may be arranged by the layout of the fisheye-lens cameras 11 to 14 in the vehicle. However, in considering that a cylindrically projected image of fisheye-lens image has a characteristic of increasing distortion at the left and right ends with horizontally spreading out, it is preferable for the object recognition to vertically combine the unit projection images in a single image to form a composite projection image.

FIG. 8 (B) is an exemplary view of a composite object-recognition output which is obtained by inputting the composite projection image of FIG. 8 (A) to a DNN model. Since a single image (i.e., the composite projection image) is inputted to a DNN model, a plurality of objects are recognized in the single image. Further, object classification may be performed in the single image by the DNN model.

Steps (S160, S170): The object recognition unit 120 obtains unit object-recognition output for each of the multi-channel unit images 15 to 18 from the composite object-recognition output. Preferably, the object recognition unit 120 decomposes the composite object-recognition output by the layout of the unit projection images 15 to 18 so as to obtain the unit object-recognition output for each of the multi-channel unit images 15 to 18. Then, the object recognition unit 120 identifies an object for each direction of the vehicle out of the unit object-recognition output.

The composite object-recognition output of FIG. 8 (B) is the result of object recognition for the composite projection image of FIG. 8 (A). Therefore, by decomposing the composite object-recognition output, the object recognition unit 120 obtains each object-recognition output for each of the multi-channel unit images 15 to 18.

Figure 9:
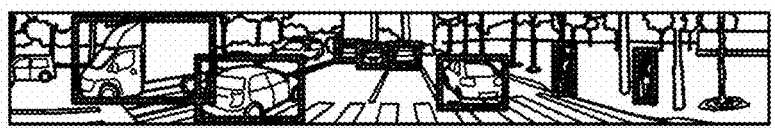
FIG. 9 is an exemplary view of unit object-recognition outputs of an AVM video.
Figure 9:
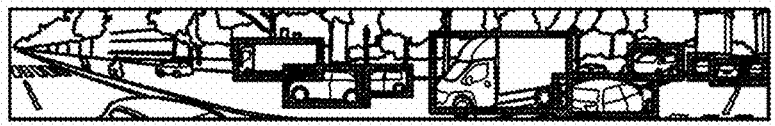
Figure 9:
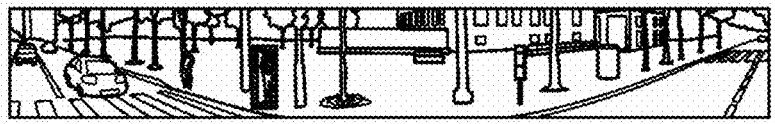
Figure 9:

FIG. 9 is an exemplary view of unit object-recognition outputs of an AVM video. By decomposing the composite object-recognition output of FIG. 8 (B) by the 4-channel unit projection image, as shown in FIG. 9 (A) to (D), four individual object-recognition outputs are obtained for four multi-channel unit images 15 to 18 which are produced by four fisheye-lens cameras 11 to 14, i.e., the front, left, right and rear fisheye-lens cameras 11 to 14 of a vehicle AVM apparatus.

Figure 10:
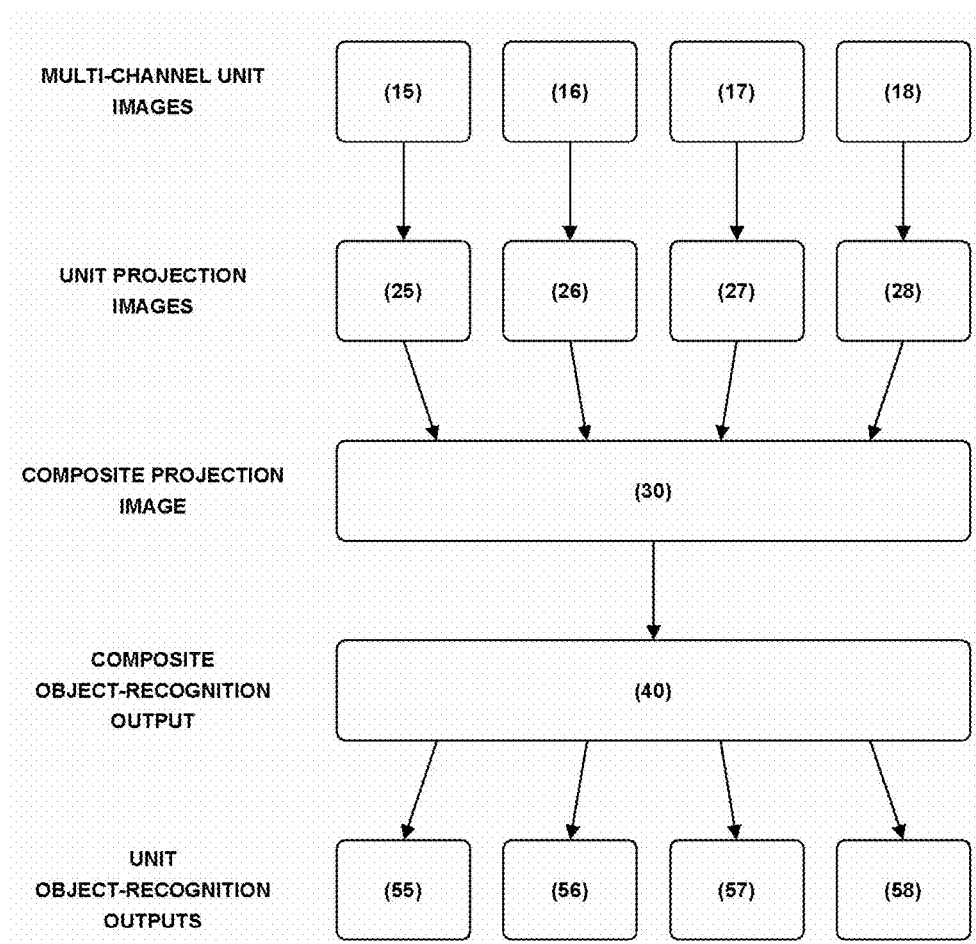
FIG. 10 is a conceptual view of data processing of the present invention.

FIG. 10 is a conceptual view of data processing of the present invention. The fisheye-lens cameras 11 to 14 produce the multi-channel unit images 15 to 18 for AVM. The multi-channel unit images 15 to 18 are individually projected onto the cylindrical projection plane so as to generate the unit projection images 25 to 28. The composite projection image 30 is obtained by combining or weaving the unit projection images 25 to 28 on a single image. Then, the composite object-recognition output 40 is obtained by inputting the composite projection image 30 to a DNN model. By decomposing the composite object-recognition output 40 by the layout of the unit projection images 25 to 28, the unit object-recognition outputs 55 to 58 are obtained for the multi-channel unit images 15 to 18.

Step (S180): Then, the object recognition unit 120 calculates a gap distance to the identified object based on the bottom part of the objects, i.e., the position of the object in a horizontal plane. With assuming that the bottom part of the identified object is attached to the ground, the object recognition unit 120 calculates a gap distance to the identified object based on relative position in a horizontal plane between the bottom part of the identified object and the corresponding fisheye-lens camera 11 to 14.

The recognized objects are identified as small when they are far away or large when they are close. However, in general, their location cannot be determined by their sizes alone. When applied to vehicles, it may be assumed that all the recognized objects are attached to the ground. This may simplify the problem of geometric relationships from 3D space to 2D plane (road surface). Therefore, the gap distance from the camera to the identified object may be correctly calculated based on the relative position in a horizontal plane between the bottom part of the identified objects and the corresponding fisheye-lens camera in a horizontal plane.

At this time, it is possible to correct errors in the placement or distance of objects which are recognized in 3D space. When objects are placed in 3D space, the positions of objects which exist in the overlapping area may be accurately corrected.

The present invention has an advantage that AVM apparatus may effectively assist in safe driving by monitoring objects around the vehicle. Further, the present invention has an advantage that object recognition may be effectively achieved by the insufficient computing resources of vehicles.

Meanwhile, the present invention can be realized in a form of a computer-readable code in a non-volatile computer-readable recording medium. Various types of storage devices are used as the non-volatile recording medium, and examples thereof include a hard disk, an SSD, a CD-ROM, a NAS, a magnetic tape, a web disk, or a cloud disk. In addition, the present invention may be realized in a form of a computer program stored in a medium to execute a specific procedure in combination with hardware.

While the present invention has been described with respect to the specific embodiments, it will be apparent to those skilled in the art that various changes and modifications may be made without departing from the spirit and scope of the invention as defined in the following claims.

What is claimed is:

1. A DNN-based object recognition method for multi-channel fisheye images of AVM video in a vehicle AVM apparatus, comprising:
    obtaining multi-channel unit images which are produced by fisheye-lens cameras of the vehicle AVM apparatus;
    forming a cylindrical projection plane around each of the fisheye-lens cameras;
    projecting the multi-channel unit images onto the cylindrical projection planes respectively so as to obtain a plurality of unit projection images;
    combining the unit projection images on a single image so as to form a composite projection image;
    inputting the composite projection image to a pre-trained Deep Neural Network (DNN) model so as to obtain a composite object-recognition output;
    decomposing the composite object-recognition output by the layout of the unit projection images so as to obtain unit object-recognition output for each of the multi-channel unit images;
    identifying an object for each direction of the vehicle out of the unit object-recognition output; and
    calculating a gap distance to the identified object based on relative position in a horizontal plane between the bottom part of the identified object and the corresponding fisheye-lens camera with assuming that the bottom part of the identified object is attached to the ground.

2. The DNN-based object recognition method for multi-channel fisheye images of AVM video according to claim 1, wherein the plurality of unit projection images are vertically arranged on a single image so as to form a composite projection image.

3. The DNN-based object recognition method for multi-channel fisheye images of AVM video according to claim 1, further comprising:
    adjusting the distance between the cylindrical projection plane and each of the fisheye-lens cameras inversely to the vehicle's driving speed.

4. A non-transitory computer program contained in a non-transitory computer-readable storage medium comprising program code instructions which execute a DNN-based object recognition method for multi-channel fisheye images of AVM video by a computer hardware device, the method comprising:
    obtaining multi-channel unit images which are produced by fisheye-lens cameras of the vehicle AVM apparatus;
    forming a cylindrical projection plane around each of the fisheye-lens cameras;
    projecting the multi-channel unit images onto the cylindrical projection planes respectively so as to obtain a plurality of unit projection images;
    combining the unit projection images on a single image so as to form a composite projection image;
    inputting the composite projection image to a pre-trained Deep Neural Network (DNN) model so as to obtain a composite object-recognition output;
    decomposing the composite object-recognition output by the layout of the unit projection images so as to obtain unit object-recognition output for each of the multi-channel unit images;
    identifying an object for each direction of the vehicle out of the unit object-recognition output; and
    calculating a gap distance to the identified object based on relative position in a horizontal plane between the bottom part of the identified object and the corresponding fisheye-lens camera with assuming that the bottom part of the identified object is attached to the ground.

5. A non-transitory computer program contained in a non-transitory computer-readable storage medium comprising program code instructions which execute a DNN-based object recognition method for multi-channel fisheye images of AVM video by a computer hardware device, the method comprising:
    obtaining multi-channel unit images which are produced by fisheye-lens cameras of the vehicle AVM apparatus;
    forming a cylindrical projection plane around each of the fisheye-lens cameras;
    adjusting the distance between the cylindrical projection plane and each of the fisheye-lens cameras inversely to the vehicle's driving speed;
    projecting the multi-channel unit images onto the cylindrical projection planes respectively so as to obtain a plurality of unit projection images;
    combining the unit projection images on a single image so as to form a composite projection image;
    inputting the composite projection image to a pre-trained Deep Neural Network (DNN) model so as to obtain a composite object-recognition output;
    decomposing the composite object-recognition output by the layout of the unit projection images so as to obtain unit object-recognition output for each of the multi-channel unit images;
    identifying an object for each direction of the vehicle out of the unit object-recognition output; and
    calculating a gap distance to the identified object based on relative position in a horizontal plane between the bottom part of the identified object and the corresponding fisheye-lens camera with assuming that the bottom part of the identified object is attached to the ground.

* * * * *